Jan. 9, 1951  E. F. G. GARNIER  2,537,580
SERVO ANEMOMETER DEVICE
Filed March 3, 1948  2 Sheets—Sheet 1
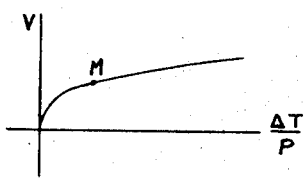
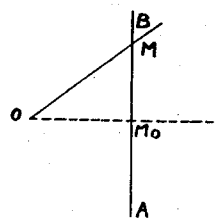
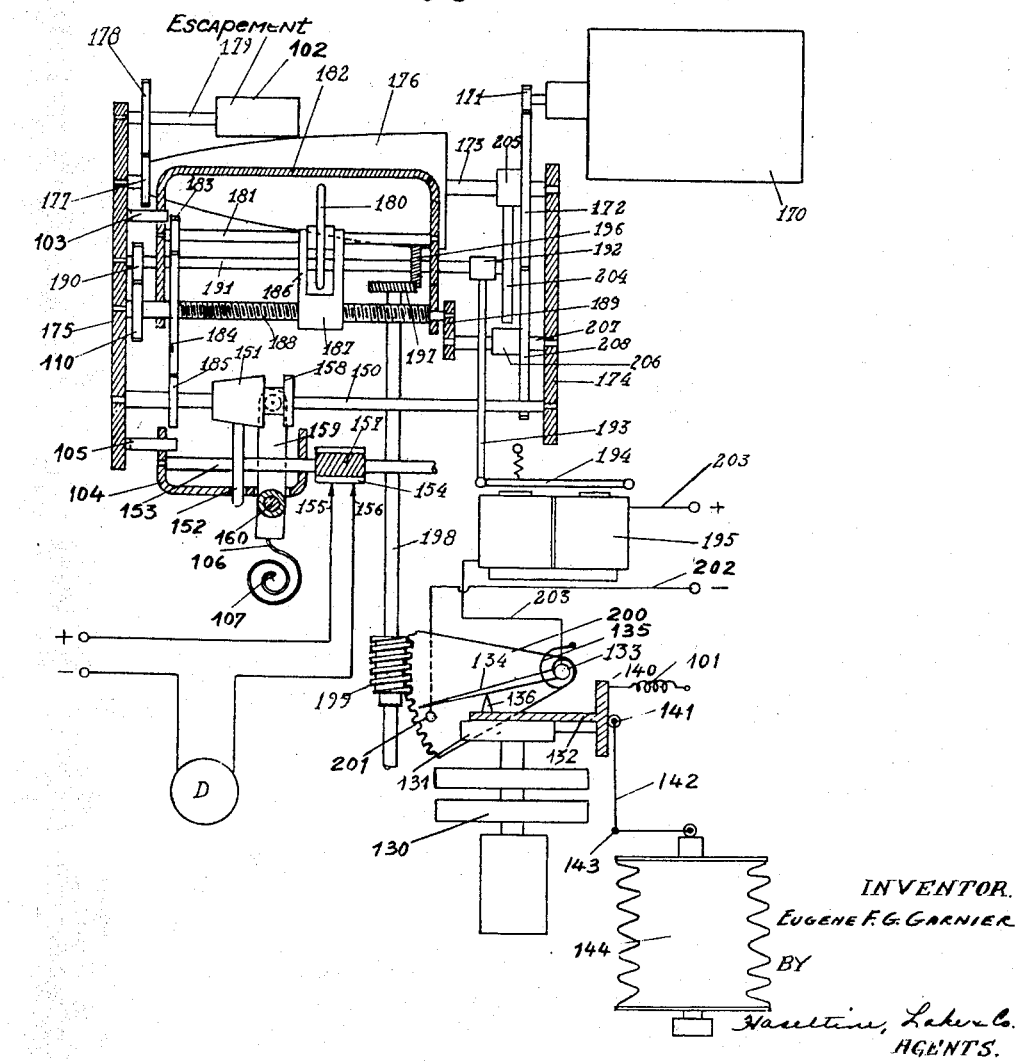
INVENTOR.
EUGENE F. G. GARNIER
BY
Hazeltine, Lake & Co.
AGENTS.

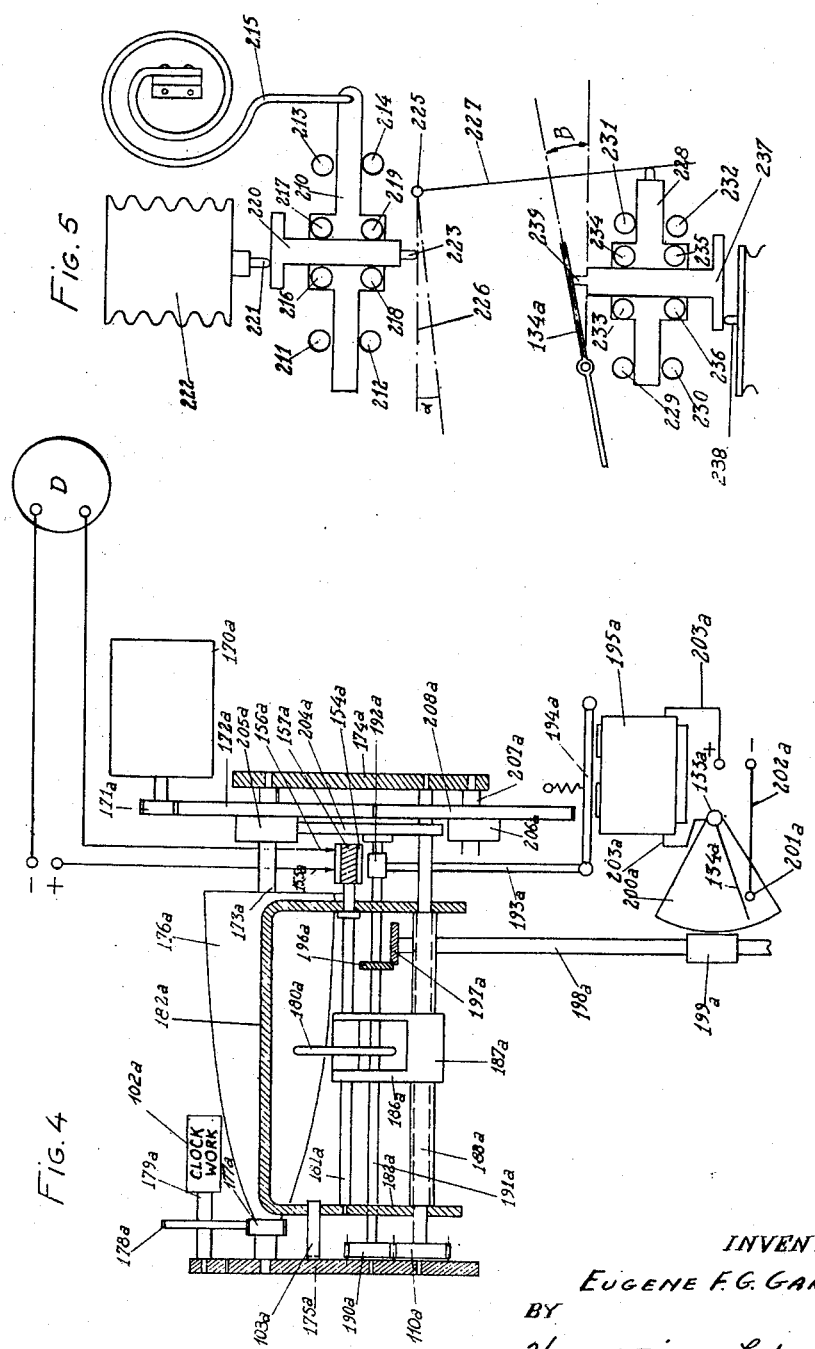

Patented Jan. 9, 1951

2,537,580

UNITED STATES PATENT OFFICE 2,537,580

SERVO-ANEMOMETER DEVICE

Eugène François Gilbert Garnier, Nice, Alpes-Maritimes, France

Application March 3, 1948, Serial No. 12,818
In France June 15, 1945

3 Claims. (Cl. 73—182)

The present invention relates to improvements in devices used for indicating the aerodynamical speed in aircrafts.

It relates more particularly to devices of such type, wherein the indications are made concurrently in response to the difference between the aerodynamic pressure and the surrounding static pressure, the value of said surrounding static pressure and the value of the absolute temperature of the surrounding atmosphere.

Devices of the above defined type have already been constructed, such devices being sometimes known as servo-anemometers, and wherein there are arranged serially along a circuit adapted to receive through a timing switch, electric timing pulses, the cycle duration of which is a function of a variable quantity N, three periodic switches, the actuation of which is controlled through devices adapted respectively to act in response to the square roots of the difference $\Delta$ between the aerodynamic pressure and the static pressure of the surrounding medium, the value P of said surrounding static pressure and the value T of the absolute temperature of the surrounding air, in such a way that the number of pulses transmitted per unit time through said periodic switches, will be a function of $\sqrt{\Delta}$, $$\sqrt{\frac{1}{P}}$$

and of $\sqrt{T}$, the resulting pulses being registered in appropriate totalizer, whereby the movable indicating member of the latter will be subjected to a displacement at a rate which is a function of the product:

$$N \times \sqrt{\frac{\Delta T}{P}}$$

In such an arrangement, the series of pulses transmitted presents gaps of more or less long duration which, while not presenting any drawbacks when it is desired to actuate a device of the totalizer type, are not permissible in the event the servo-anemometer is to be associated with an instantaneous speed indicator, as is considered to be essential in current aircraft navigation, especially because the continual increases in the speed and altitude of the aircraft result in greater and greater variations in the factors $\Delta$, P and T and, as a consequence, the discontinuous character of the operation of the device tends to become amplified.

Moreover, the increase in the actual speed of aircraft is such that it is no longer possible to consider $\Delta$ as being proportional with the square of the speed. Rather, $\Delta$ should be considered as being expressed by a formula of the following form:

$$\Delta = \frac{P}{T} f(V)$$

or reversely:

$$V = F\left(\frac{\Delta T}{P}\right)$$

Plotting the curve representing this function with the values of $$\frac{\Delta T}{P}$$

in abscissae and the values of V along the ordinates, and rotating said curve about the abscissa axis at a constant angular rate, there is obtained a solid of revolution each point M of which moves at a speed proportionate to V if its abscissa is proportionate to $$\frac{\Delta T}{P}$$

The main object of this invention is to provide, in a servo-anemometer, means adapted to compensate for or cancel out the effects of discontinuity and irregularity in the series of resulting pulses.

Another object of the invention is to provide, in a servo-anemometer of the character described, means for varying the frequency of the timing pulses in proportion to the variations of a function of the fraction $$\frac{\Delta T}{P}$$

A further object of the invention is to provide, in a servo-anemometer of the character described, a timing switch driven in rotation by at least one member adapted at any time to be tangent to a point of a surface of revolution of the above defined character generated as described by the representative curve of the function of at least two variables.

Still another object of the invention is to provide, in a servo-anemometer of the character described, two means, one of which is tangent to a surface of revolution, the generatrix of which represents a function of T, and the other one to a surface of revolution representative of a function of the fraction $$\frac{\Delta}{P}$$

the variations of which fraction are of lesser amplitude than those of each of its terms taken separately, since both said terms essentially vary in the same direction to each other.

Yet another object of the invention is to provide, in a servo-anemometer of the character described, means for converting the indication of the variations of the ratio between two variables into an indication of the variations of the tangent of an angle variable as a function of both said variables.

The ensuing description, made in reference to the accompanying drawings, given merely by way of indication and not of limitation, will clearly show in what way the invention may be put into practice. In the drawings:

Fig. 1 is a curve representative of the function:

$$V = F\left(\frac{\Delta T}{P}\right)$$

Fig. 2 is an explanatory diagram illustrating the operation of an improved device according to the invention adapted to translate or convert into mechanical operations the variations of the ratio $$\frac{\Delta}{P}$$

wherein P is the surrounding static pressure and $\Delta$ is the difference between the aerodynamic pressure and the surrounding static pressure.

Fig. 3 is a diagrammatic view of a device for converting or translating into mechanical and electrical operations the variations of the function $$\sqrt{\frac{\Delta T}{P}}$$

Fig. 4 is a diagrammatic view of a different embodiment of the device shown in Fig. 3.

Fig. 5 is a diagrammatic showing of a device for mechanically translating the variations of the function $$\tan \beta = \frac{\Delta T}{P}$$

Referring to Fig. 1, there is illustrated the representative curve for aerodynamic speed in an aircraft as a function of the difference $\Delta$ between the aerodynamic pressure and the static pressure of the surrounding medium, the value P of said surounding static pressure and the value T of the absolute temperature of the surrounding air, wherein the values of V are plotted against the values of $$\frac{\Delta T}{P}$$

In some cases encountered in present practice, a sufficient approximation is given by assuming that the function between the aerodynamic speed and the three above defined variables is of the form:

$$N \times \sqrt{\frac{\Delta T}{P}}$$

To mechanically translate the variations of the ratio $$\frac{\Delta}{P}$$

for instance, it is convenient to use the geometric feature illustrated in Fig. 2.

In this figure, AB is a straight line which may be displaced so as to remain parallel to a constant direction, O is a fixed point contained in the plane of displacement of the line AB, OM is a straight line issued from O and extending through a point M movable along the line AB, M$o$ designates the foot of the perpendicular line from O to the line AB. Assuming the displacements of AB and of the point M to be so correlated that at any given instant OM$o$ will be proportional to P and MM$o$ will be proportional to $\Delta$, it will be seen that the tangent of the angle M$o$OM equals $$\frac{\Delta}{P}$$

The above property is used in the device illustrated in Fig. 3, in order to obtain a transmission of electric pulses at a pulsing frequency which is a function of $$\frac{\Delta T}{P}$$

As shown in Fig. 3, there is mounted upon a frame structure, not shown, the fixed end of a manometric capsule 130, the movable end 131 of which is suitably formed so as to serve as a guide for a slide block 132 movable in a direction at right angles to the axis of the capsule 130. Opposite to the movable end 131 of the manometric capsule, a lever 134 is mounted so as to be pivotable about an axis 133 perpendicular to the plane defined by the center axis of the capsule 130 and the direction of displacement of the slide block 132. Said lever 134 is maintained for instance through a spiral spring 135 in contact engagement with a projection 136 of the slide block 132.

The slide block 132 at one of its ends comprises an arm 140 forming a T, the outer side face of which is substantially parallel with the axis of the manometer capsule 130. Said outer face of the arm 140 of the slide block 132 is at all times applied for instance by the action of a spring 101 against the follower roller 141 provided at the end of one of the arms of a bell-crank lever 142 pivoted on an axis 143. The other arm of the lever 142 is connected with the movable end of a barometer capsule 144, the opposite end of which is secured to the frame, not shown, of the device. If the manometer capsule 130 is so arranged as to measure the amount $\Delta$, while the barometer capsule is arranged to measure the amount P, it will be seen that the tangent of the angle formed between the lever 134 and the direction of displacement of the slide block 132 is equal to $$\frac{\Delta}{P}$$

The above described device shown in Fig. 3 further makes it possible to obtain a multiplication by the factor $\sqrt{T}$ by means of a device adapted to modify the pulse frequency of the pulses transmitted at function of $\sqrt{T}$. For this purpose, a shaft 150, driven in rotation at a rate which is the function of $$\sqrt{\frac{\Delta}{P}}$$

through drive means to be described hereinafter, has slidably keyed thereon a drum member 151 adapted to be slidable along said shaft 150 as will be described later. Said shaft 150 is journalled at both its ends in fixed flanges 174 and 175. The periphery of the drum 151 engages a roller 152 keyed on a shaft 153 journalled in a support 104 pivotally mounted around a pin 105 and adapted to be movable under the action of a return spring not shown connected with the flange 175 so that the roller 152 is constantly maintained in contact with the surface of the drum 151 in the sliding movements of the latter along the shaft 150. The shaft 153 has keyed thereon the rotor member 154 of the rotary switch, the brushes 155 and 156 of which simultaneously engage one or more conductive strip elements 157 of equal width provided at the periphery of the rotor 154. The brushes 155 and 156 are connected in series in an electric pulse generating circuit connected with an utilization apparatus D receiving the indication of the speed of shaft 153 by means of successive impulses emitted by the rotary switch.

The drum 151 is formed with an angular groove 158 into which project fingers or lugs provided at the end of the arm of the fork-shaped lever 159 pivoted at its opposite end on a pivotal axis 160. The oscillations of said lever about its axis 160, are controlled from a thermostatic strip 106 secured as at 107 to the frame of the device, in such a way that the sliding displacements of the drum 151 along the shaft 150 will be a function of the absolute temperature T. If further a suitable longitudinal contour is imparted to the drum it will be seen that the speed of rotation of the roller 152 and consequently of the rotary switch secured on the shaft 153 of said roller may be made to vary as a function of $\sqrt{T}$, whereby the number of pulses generated by the rotary switch per unit time, will also be a funtion of $\sqrt{T}$, assuming $\Delta$ and P to remain constant.

For the purpose of effecting a multiplication by $$\sqrt{\frac{\Delta}{P}}$$

a cam and follower roller arrangement is used which is similar to the one just described in connection with multiplication by $\sqrt{T}$. However, since multiplication by $$\sqrt{\frac{\Delta}{P}}$$

requires the use of a cam of large size, it is not practicable to displace the related roller by directly connecting it with the lever 134 subjected to the variations of $$\frac{\Delta}{P}$$

As shown, a suitable motor 170 through a pinion 171 secured on its drive shaft, drives a gear 172 secured on a shaft 173 journalled at both ends in fixed flanges 174 and 175. The shaft 173 has secured thereon, a cam 176 and the speed of the shaft 173 is held at a strictly constant value by any suitable means, such as a conventional clockwork escapement mechanism 102 adapted to control the speed of a shaft 179 operatively connected with the shaft 173 through gears 177 and 178.

A suitable follower roller 180 is maintained applied against the periphery of the cam 176. The roller 180 is slidable along a shaft 181 with which it is connected in rotation. The shaft 181 is journalled at its ends in a support 182 and drives the shaft 150 by means of a pinion 183 secured on the shaft 181, a freely rotatable gear 184 meshing with said pinion 183 and a pinion 185 secured on the shaft 150.

The displacements of the follower roller 180 along its shaft 181 are effected in the following manner: the hub of the roller 180 is arranged between the prongs of a fork 186, the body portion 187 of which is adapted to form a non-rotatable nut threaded on a screw 188 journalled at both ends thereof upon the support 182, the flange 175 and the flange 189. The support 182 is rockable around the screw 188 and is resiliently urged by the action of the spring 103 connected with the flange 175 for instance in such a manner that the follower roller 180 is always in contact with the cam 176. The screw 188 at one of its ends rigidly supports a pinion 110 meshing with the pinion 190 secured on a shaft 191 journalled at one of its ends in a suitable aperture formed in the flange 175 and at its opposite end in a bearing 192 secured at one end of a rod 193 secured at its opposite end to the armature 194 of an electro-magnet 195 for a purpose to be described later.

A pinion 196 secured on the shaft 191 at all times meshes with a pinion 197 secured on one end of the shaft 198 connected with a worm 199 meshing with a toothed sector 200 rotatable on the shaft 133 of the lever 134. The sector gear 200 has provided thereon a contact plate 201 connected through a wire 202 with one of the terminals of a source of current, the opposite terminal of which is through a conductor 203 connected with a conductive lever 134 through the winding of the electro-magnet 195.

The shaft 191 on the end thereon adjacent to the bearing 192 has secured thereon a friction wheel 204, the periphery of which is adapted to selectively engage either a hub member 205 secured on the shaft 173 or a hub member 206 secured on a shaft 207 journalled at both ends thereon in apertures formed in the flanges 174 and 189. The shaft 207 is rigid with a gear 208 meshing with the gear 172 secured on the shaft 173 and it will thus be seen that the hubs 205 and 206 are rotated in reverse direction from each other.

The above described device operates as follows:

When the pivotal lever 134, the angular displacements of which are a function of $$\frac{\Delta}{P}$$

is not in contact engagement with the contact plate 201, the energizing circuit for the magnet 195 is opened, the armature 194 is returned to its rest condition and shifts the bearing 192 upwards thus bringing the friction wheel 204 into contact with the hub member 205. The shaft 191 is then rotated and rotates the screw 188 which shifts the nut 187 and consequently the roller 180 towards the left as shown in the figure. At the same time, the shaft 191 rotates the vertical shaft 198 and the worm 199 in such direction that said worm 199 will rotate the gear sector 200 in a direction to bring the contact plate 201 into engagement with the lever 134.

As soon as such contact has been made, the energizing circuit for the magnet 195 is completed and the armature 194 is attracted. Said armature shifts the bearing 192 downwards and brings the friction wheel 204 in contact with the hub member 206. The shaft 191 is then rotated in reverse direction and drives the screw 188 in a direction to cause a rightward displacement of the roller 180 as shown in the drawing. Concurrently, the shaft 191 rotates the vertical shaft 198 and the worm 199 in a direction such that the gear sector 200 will be rotated to break the contact between the contact plate 201 and the lever 134.

It will be seen that at any instant, the position of the roller 180 along the cam 176 is conditioned by the inclination of the lever 134 which in turn is function of $$\frac{\Delta}{P}$$

Provided the profile of the cam 176 is suitably predetermined, it will be seen that the angular speed of the roller 180 and therefore that of the shaft 150 will be proportional with $$\sqrt{\frac{\Delta}{P}}$$

As a result of the provision of the device described for multiplying by the factor $\sqrt{T}$, it will be seen that as a net result the speed of rotation of the shaft 153 and therefore the number of electric pulses generated by the rotary switch 153, mounted on said shaft 153 will be a function of $$\sqrt{\frac{\Delta T}{P}}$$

An equivalent result could be obtained through the use of a single cam on condition that the displacements of the roller along said cam would be a function of $$\frac{\Delta T}{P}$$

Figs. 4 and 5 illustrate such a device. In the device diagrammatically shown in Fig. 4, similar reference numerals followed by the letter $a$ have been used to designate similar elements as in the device of Fig. 3 and this device will not be described anew. However, in the device shown in Fig. 4, the shaft 181 which has slidably keyed thereon the roller 180a, carries the pulse generating rotary switch. Moreover, in this device, the inclination of the lever 134a is at each instant a function of $$\frac{\Delta T}{P}$$

and this feature is obtained in the manner now to be described in reference with Fig. 5.

According to this figure which is essentially diagrammatic in character, a plate 210 is guided by means of rollers 211 to 214 and its displacements are constantly proportional with the variations in the absolute temperature T because one of its ends is connected with a thermostatic strip 215 for instance, the deformation of which is a function of the variation in temperature.

The plate 210 has mounted thereon four rollers 216 to 219 between which there is arranged a ruler 220 so as to be guided by said rollers, while being slidably perpendicularly to the direction of displacement of the plate. The ruler 220 is at one of its ends subjected to the action of a finger 221 displaceable in response to the variations in the magnetitude P and which for this purpose, may for instance be connected with the movable end wall of a manometer capsule 222. The ruler 220 at its opposite end terminates in a finger 223 maintained in continual engagement with one arm 226 of a bell-crank lever bent at right angle and pivoted on a fixed axis 225. It will be seen that provided the initial setting is suitably made, the angle $\alpha$ by which the arm 226 of the lever is rocked with respect to its initial position, corresponding to $P=0$, will be given by the formula:

$$\tan \alpha = \frac{P}{T}$$

The opposite arm 222 of the bell-crank lever is at all times applied against the end of a movable plate 228 guided between four rollers 229 to 232 in such a way that the longitudinal displacements of said plate 228 will be proportional with $$\frac{P}{T}$$

Upon the plate 228 there are provided four rollers 233 to 236 serving to guide the displacements of a ruler 237 in a direction perpendicular to the displacement of the plate 228. The ruler 237 at one of its ends is maintained in contact with a finger 238 movable as a function of the variations in $\Delta$, while at its opposite end the ruler 237 comprises a finger 239 adapted to engage the lever 134a, and it will be seen that the angle $\beta$ formed at any given instant by the lever 134a with its initial setting corresponding with $\Delta=0$, will be defined by the formula:

$$\tan \beta = \frac{\Delta}{\frac{P}{T}} = \frac{\Delta T}{P}$$

In such conditions and as a result of a suitable contour provided for the cam 176a, it will be understood that the angular rate of the roller 180a and of the shaft 181a carrying the timing switch 155a, and consequently the number of pulses generated will be a function of $$\sqrt{\frac{\Delta T}{P}}$$

It will of course be understood that the invention is not restricted to the forms of embodiment specifically described and illustrated and that modifications may be made within the scope of the ensuing claims.

In particular the cams rather than being defined with regard to the square roots of the respective variables, may be determined with the contour corresponding to any desired function of the ratio $$\frac{\Delta T}{P}$$

of said variables.

What I claim is:

1. In a servo-anemometer of the type described for inducing a movement the speed of which is in direct ratio with the air speed of an aircraft, a frame, drive means mounted on said frame, a rotatable shaft on said frame, transmission means from said drive means to said shaft, means for maintaining the speed of said shaft constant, a cam of revolution secured on said shaft and the generatrix of which is a curve representative of a function of $$\frac{\Delta T}{P}$$

a support movable with respect to said frame, a second shaft on said movable support parallel with said first shaft and rotatable at a speed in direct ratio to the air speed of the aircraft, a rotatable member movable parallel with said first rotatable shaft, supported on and drivingly connected with said second shaft and adapted to remain tangent with the surface of said cam, resilient means urging the support and thereby said movable member against said cam, and means for moving said movable member as a function of the current value of $$\frac{\Delta T}{P}$$

2. In a servo-anemometer of the type described for inducing a movement the speed of which is in direct ratio with the air speed of an aircraft, a frame, drive means mounted on said frame, a rotatable shaft on said frame, transmission means from said drive means to said shaft, means for maintaining the speed of said shaft constant, a cam of revolution secured on said shaft and the generatrix of which is a curve representative of a function of $$\frac{\Delta T}{P}$$

a support movable with respect to said frame, a second shaft on said movable support and parallel with said first shaft and rotatable at a speed in direct ratio to the air speed of the aircraft, a rotatable member movable parallel with said first rotatable shaft, supported on and drivingly connected with said second shaft and adapted to remain tangent with the surface of said cam, resilient means urging the support and thereby said movable member against said cam, means for moving said movable member as a function of the current value of $$\frac{\Delta T}{P}$$

a periodic electric switch on said second shaft, and electric circuit means connected with said switch.

3. A servo-anemometer as in claim 1, wherein the means for moving the movable member as a function of the current value of $$\frac{\Delta T}{P}$$

comprises a first slide block, a thermometric device having one end connected with the frame and the opposite end connected with said first slide block for moving said first slide block as a function of T, guide means for said first slide block, a barometer capsule having one end connected with said frame and the opposite end of which is adapted to be movable perpendicularly to the movements of said first slide block, a second slide block continuously in contact with the free end of said barometer capsule and movable thereby perpendicularly to said first slide block, guide means for said second slide block on said first slide block, a right-angle bell-crank lever pivoted on said frame having one arm in contact with said second slide block, a third slide block, adapted to move parallel with said first slide block and at all times in contact with the other arm of said bell crank lever, guide means for said third slide block, means responsive to the variations in $\Delta$ having one end rigid with the frame and the other end movable perpendicularly to said third slide block, a fourth slide block at all times in contact with the movable end of said $\Delta$ responsive means and movable perpendicularly with said third slide block, guide means for said fourth slide block on said third slide block, a lever pivoted on said frame and engaging said fourth slide block and means connecting said movable member with said lever, the positions of which represent the current value of $$\frac{\Delta T}{P}$$

EUGÈNE FRANÇOIS GILBERT GARNIER.

REFERENCES CITED

The following references are of record in the file of this patent:

UNITED STATES PATENTS

| Number | Name | Date |
|---|---|---|
| 1,354,832 | Jung | Oct. 5, 1920 |
| 2,251,498 | Schwein | Aug. 5, 1941 |

FOREIGN PATENTS

| Number | Country | Date |
|---|---|---|
| 374,730 | Germany | Apr. 27, 1923 |
| 193,452 | Great Britain | Feb. 26, 1923 |